Figure 1:
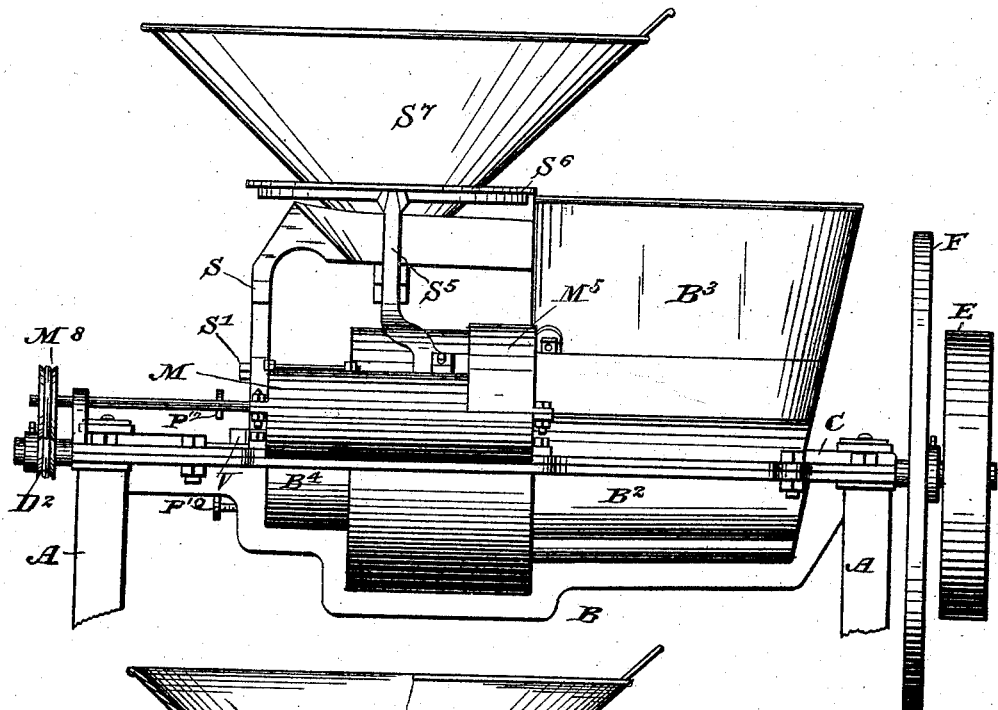

No. 608,085. Patented July 26, 1898.
A. W. STRAUB.
DOUBLE EQUALIZING GRINDING MILL.
(Application filed Nov. 30, 1896.)
(No Model.) 4 Sheets—Sheet 1.

Witnesses
E. B. Bolton
C. A. Rogers

Inventor
Ambrose W. Straub
By Attorney
James R. Rogers

No. 608,085. Patented July 26, 1898.
A. W. STRAUB.
DOUBLE EQUALIZING GRINDING MILL.
(Application filed Nov. 30, 1896.)
(No Model.) 4 Sheets—Sheet 3.

Witnesses
E. B. Bolton
C. S. Rogers

Inventor
Ambrose W. Straub
By Attorney
James R. Rogers

No. 608,085. Patented July 26, 1898.
A. W. STRAUB.
DOUBLE EQUALIZING GRINDING MILL.
(Application filed Nov. 30, 1896.)
(No Model.) 4 Sheets—Sheet 4.

Witnesses
E. B. Bolton
C. A. Rogers

Inventor
Ambrose W. Straub
By James R. Rogers
Attorney

United States Patent Office.

AMBROSE W. STRAUB, OF PHILADELPHIA, PENNSYLVANIA.

DOUBLE EQUALIZING GRINDING-MILL.

SPECIFICATION forming part of Letters Patent No. 608,085, dated July 26, 1898.

Application filed November 30, 1896. Serial No. 613,944. (No model.)

*To all whom it may concern:*

Be it known that I, AMBROSE W. STRAUB, a citizen of the United States, residing at Philadelphia, in the county of Philadelphia and State of Pennsylvania, have invented certain new and useful Improvements in Double Equalizing Grinding-Mills; and I do hereby declare the following to be a full, clear, and exact description of the invention, such as will enable others skilled in the art to which it appertains to make and use the same.

This invention relates to double equalizing grinding-mills for corn and other products in which two grinding-cases are employed, which are separated by a dam or partition to prevent the material ground in the first mill or case from passing into the second mill or case except by way of the conveyer arranged at the side of the mill and in which a longitudinally-movable spindle carries a running head, to which are bolted the two revolving disks, and by means of the construction employed the pressure caused by grinding in one mill is balanced by the grinding in the other mill or case.

My invention also relates to the non-revolving disk of the first mill or case, which is seated on a tramming-ring and which adjusts this disk into true tram with the running one, as shown by its male and female seat near its inner edge, where it is seated on the back plate or tramming-ring seat, and the back non-revolving grinding-disk of the second mill is also seated on a tramming-ring held up to the running disk by a ring bridge-tree provided with points on which the tramming-ring rocks, and the bridge-tree is adjusted forward on the points of two temper-screws upon which the bridge-tree rocks, and thus the back disk is free to adjust itself true to the running disk.

In the cob-crushing chamber is located upon the longitudinally-movable spindle the screw-shaped toothed threaded cob-crushing sleeve, which cuts and saws the cobs fine enough to enter the first mill or case, into which it forces the product, which after it has been ground in the first mill is discharged into the conveyer-case, where the screw conveyer carries it to the back end of the mill and delivers it to the back feed-screw, which forces it into the second mill or case, where it is reground finer by reason of the pressure of the coarse product in the first mill and discharged from the opposite side of the mill or case.

By means of the construction herein described a saving of about one-third of the power is secured, which in the mills heretofore used was wasted by the pressure against the end of the spindle, because as soon as the bridge-tree is set forward the back mill or case is caused to grind finer, and the pressure thus occasioned in turn forces the spindle forward, making the first mill or case also to grind finer. Thus the spindle will then move endwise between the pressure until the pressure in one mill will balance or equalize that in the other mill.

With these and other objects in view the invention consists in the construction, combination, and arrangement of parts hereinafter more fully described in the specification and illustrated in the accompanying drawings, in which—

Figure 2:
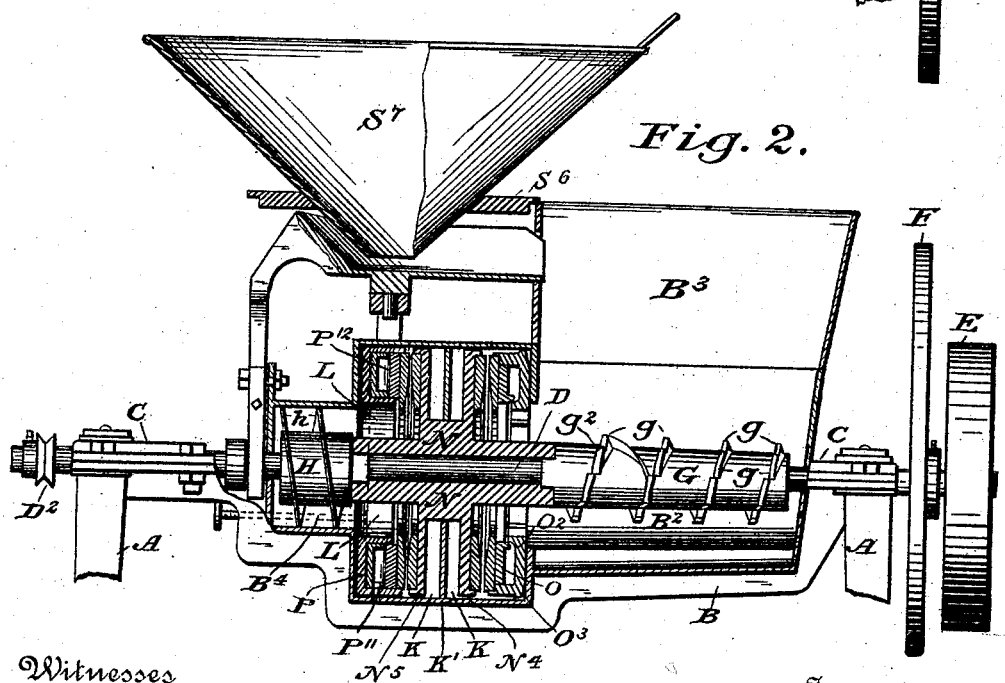
Figure 3:
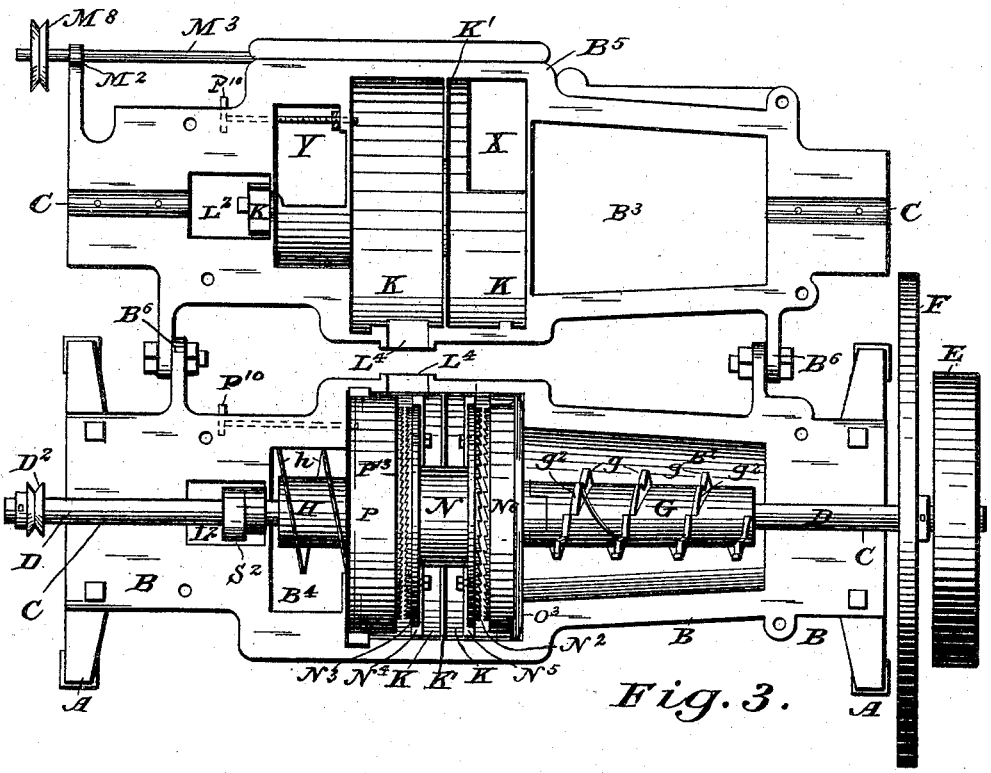
Figure 4:
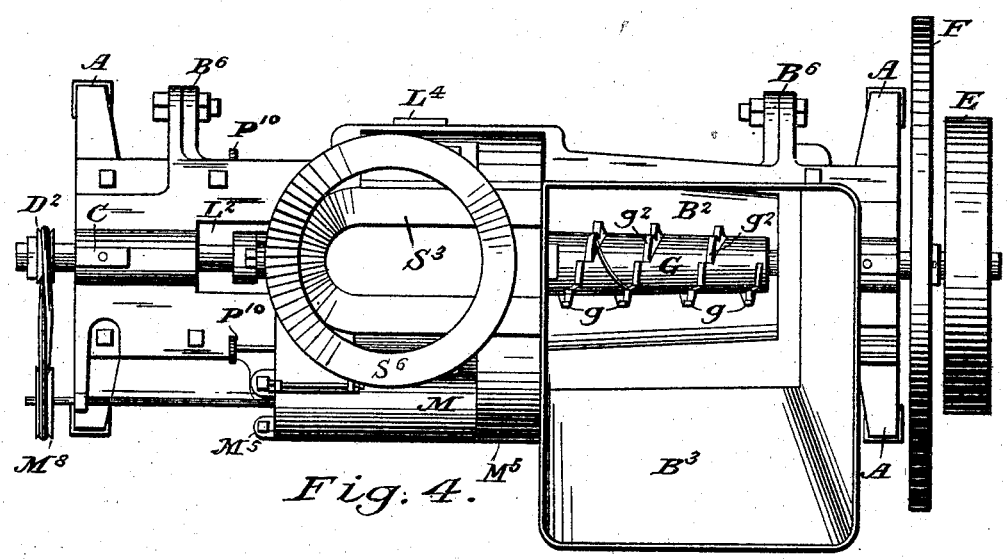
Figures 5, 6, 7:
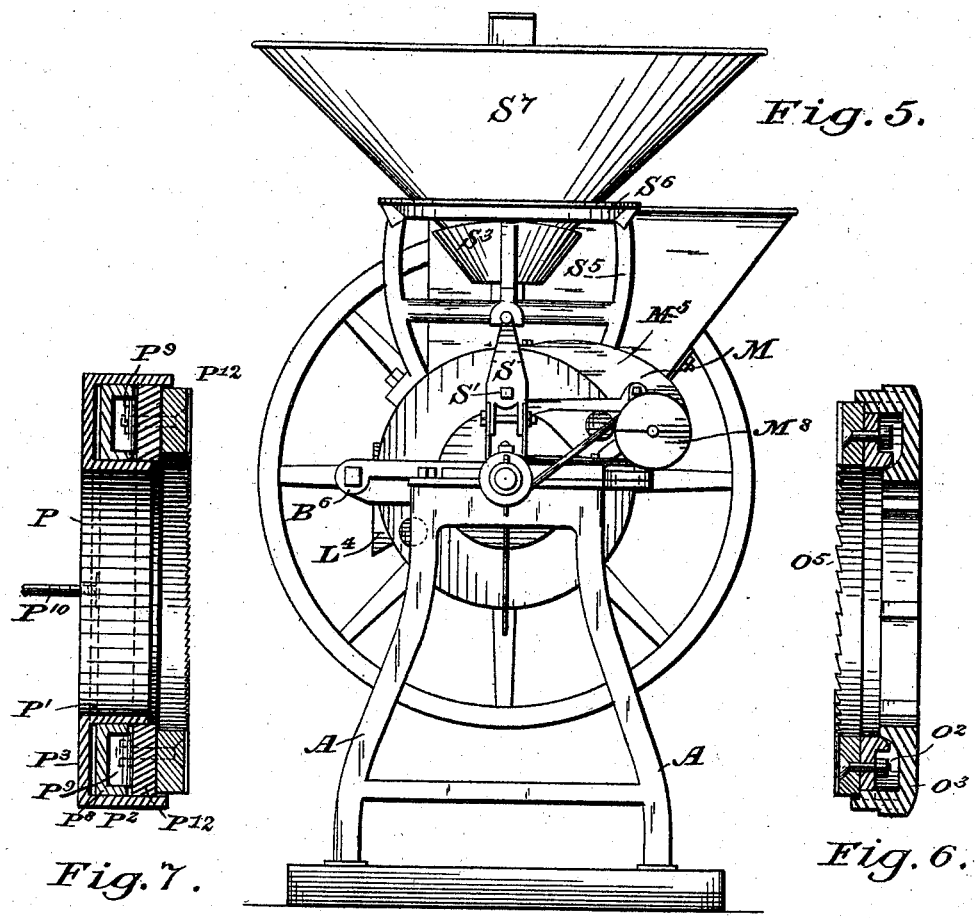
Figures 8, 9:
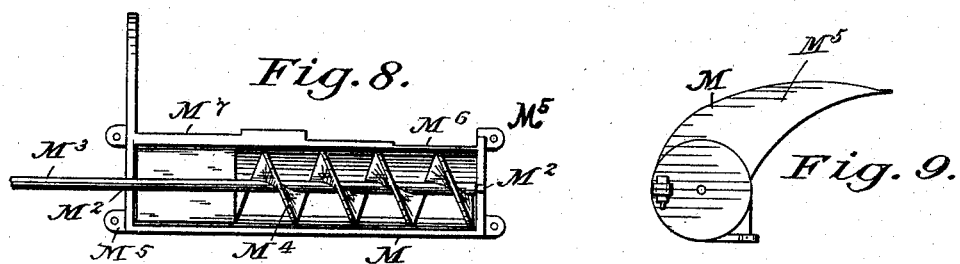

Figure 1 is a side elevation of my improved grinding-mill. Fig. 2 is a similar view, partially in section. Fig. 3 is a top plan view showing the upper section or casing thrown back. Fig. 4 is a similar view with the section or casing closed. Fig. 5 is an end view of the machine complete. Figs. 6 and 7 are detailed views of the grinding-disks of the first and second mill. Fig. 8 is a detailed view of one-half of the conveyer detached. Fig. 9 is a detail of the conveyer-casing, and Figs. 10 to 17 represent details of the several parts.

Similar letters designate like parts throughout the several views.

Referring to the drawings, the letter A designates the legs or the supports of the machine, which are suitably secured to a base or the floor, and to the upper ends of these legs is bolted the lower half B of the mill-frame, which is provided with suitable bearings or journals C, adapted to receive the longitudinally-adjustable drive shaft or spindle D, which carries the drive or pulley wheel E and the fly-wheel F.

Within the cob crushing and feeding chamber $B^2$, which is provided with funnel-shaped corncob-hopper $B^3$, is the cob-crushing sleeve G, mounted upon the shaft D, and this sleeve is provided with a spiral rib $g$, having notches $g^2$, and mounted upon the opposite end of the shaft D is a feed-screw H, having a spiral rib or flange $h$, and this feed-screw revolves in a chamber $B^4$, formed by concavities or depressions in the lower portion B and the upper portion $B^5$ of the mill-frame, and between the cob-crushing chamber and the feed-screw chamber are the grinding-chambers K, separated by a meal dam or partition $K'$, and communicating with the feed-screw chamber $B^4$ is an annular passage L, adapted to admit the feed from the chamber $B^4$ to the grinding-disks of the second mill, beyond which chamber $B^4$ is formed eccentric-opening $L^2$ to admit of the movement of the eccentrics V upon the drive-shaft D.

In the bottom portion B of the mill-frame and communicating with the second mill is a dust-hole $F''$, Fig. 2, and formed at one side of the mill-frame is a discharge-opening $L^4$ for the ground meal. (Illustrated in Figs. 3, 4, and 5.)

It will be understood that the top or upper portion $B^5$ of the mill-frame is similar in construction to the bottom or lower portion B and that it is connected thereto by a hinge connection or other suitable means $B^6$.

The conveyer M is connected with or secured to the upper portion $B^5$ of the mill-frame by means of bolts or screws which pass through the apertured lugs $M^5$, formed on the conveyer, and upon one side thereof is formed a segmental receiving-spout $M'$, Figs. 1, 4, 5, and 9, which extends over and rests upon the upper portion $B^5$ of the mill-frame directly over the grinding-chamber of the first mill, and the under or concave portion of the spout $M'$ is open and registers with the opening X in the upper portion $B^5$ of the mill-frame, so that when the material from the crushing-chamber enters the grinding-chamber of the first mill it is taken up by the grinding-disks therein and after being ground is forced into the opening X in the mill-frame portion $B^5$, thence into the spout $M'$ to the conveyer through the inlet-opening $M^6$ therein, Fig. 8, and the material is then taken up by the conveyer-screw $M^4$, mounted on the shaft $M^3$, journaled in bearings $M^2$ in the ends of the conveyer, and is conveyed to the discharge-opening $M^7$ at the opposite end of the conveyer, Fig. 8, from whence it is discharged through the opening Y in the upper portion $B^5$ of the mill-frame into the back-feed-screw chamber $B^4$.

The conveyer-shaft $M^3$ extends beyond the conveyer-casing and is provided at the extended end with a sheave or pulley-wheel $M^8$, adapted to receive the belt which passes over the similar wheel $D^2$ on the outer end of the shaft D, as shown in Figs. 1, 3, 4, and 5.

The running head N is keyed to the shaft D and clutched to the cob-crushing sleeve G and to the feed-screw H, which revolve on both sides of the meal dam or partition $K'$, and it carries the disks $N^7 N^7$, and the grinding-disks $N^2$ and $N^3$ and the meal-scrapers $N^4$ and $N^5$ are secured thereto.

Figure 14:
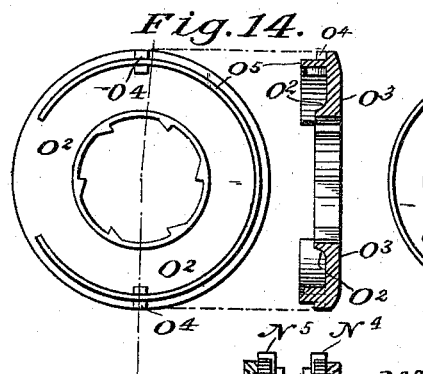
Figure 15:
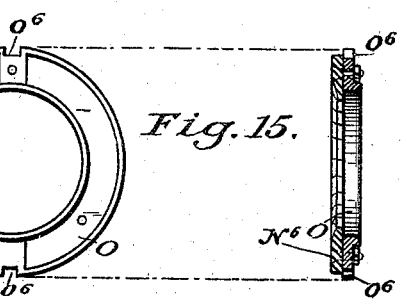
Figure 16:
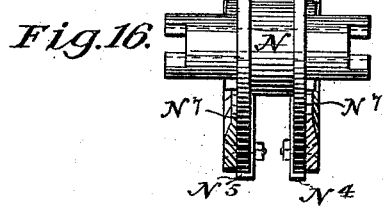

The tramming-ring O of the first mill (shown in Figs. 6, 14, and 15) rocks on a concave seat $O^2$, formed on the back plate $O^3$, which has a hood above the tramming-ring to prevent dust from falling behind the ring and the back plate, and this ring is also provided with recesses $O^6$, in which fit or take the lugs $O^4$ on the back plate $O^3$, in order to fix the ring upon its seat, as shown in Figs. 14 and 15, and the grinding-disk $N^6$, secured to the said tramming-ring O, all form parts of the first mill.

Figure 13:
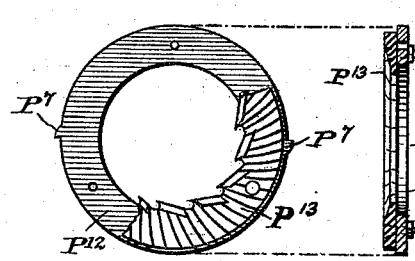
Figure 17:
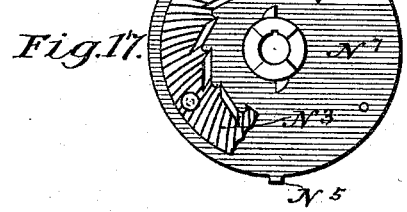

The grinding-disk $P^{13}$ is secured to the tramming-ring $P^{12}$, Figs. 6 and 13, and the grinding-disk $N^3$, mounted upon one of the disks $N^7$, secured to the running head N, Fig. 17, form parts of the second mill.

The details of construction illustrated in Figs. 6, 14, and 15 refer to parts of the first mill, while the details of construction illustrated in Figs. 7, 10, 11, 12, and 13 represent the parts of the construction of the second mill.

The case P, (shown in Fig. 10,) forming a part of the second mill, is composed of an inner ring $P'$ and an outer ring $P^2$ and a back plate $P^3$, and it is prevented from revolving by lugs or projections $P^6$, and the said case P is adapted to receive the tramming-ring $P^{12}$ of the second mill, which is likewise prevented from revolving by the lugs formed thereon, and the grinding-disk $P^{13}$ of the second mill is bolted or otherwise secured to this tramming-ring $P^{12}$.

Figure 11:
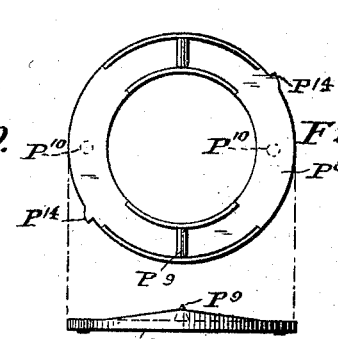
Figure 12:
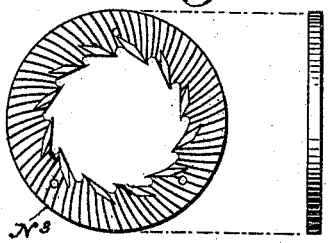

Back of the tramming-ring $P^{12}$, in the meal-proof case, is the bridge-tree $P^8$, Fig. 11, provided on diametrically opposite points with V-shaped lugs or projections forming knife-edged contacts upon which the tramming-ring $P^{12}$ rocks, and the bridge-tree $P^8$ has formed thereon peripheral shoulders or lugs $P^{14}$, adapted to engage the recesses $P^6$ in the periphery of the case P to prevent the revolution of the bridge-tree, and the bridge-tree rests upon the points of the regulating-screws $P^{10}$, as shown in Figs. 1, 3, 4, 7, and 11, which are secured in the frame of the mill and extend through the back plates of the case P and carry jam-nuts, as shown, and by means of these screws the position of the bridge-tree may be regulated as desired.

Figure 10:
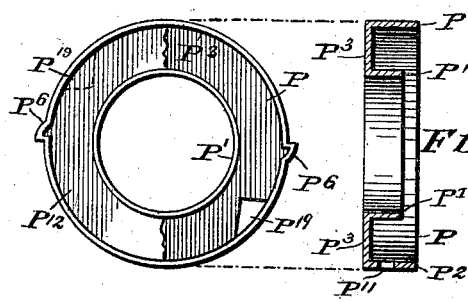

A hole $P^{11}$ is formed in the under side of the case and permits the meal which may leak into the said case to fall to the floor, and additional holes $P^{19}$ are also formed in the back plate $P^3$, as clearly shown in Fig. 10.

The damsel-bar S (shown in Fig. 5) has a fulcrum-bolt $S'$ near its center and a yoke at the lower end, and the top end of the damsel-bar engages the back end of the feed-shoe $S^3$, which is provided near its center with a fulcrum-pin. The reference-letter $S^7$ indicates the shelled-grain hopper, and $S^6$ the hopper-stool ring, and $S^5$ the hopper-stool.

The operation of the mill will readily be understood from the foregoing description of its construction when taken in connection with the following description of the function of the several parts.

The grain is placed in the hopper S⁷. Thence it is fed into the cob-hopper B³. Thence it will feed into the crushing-chamber and be there crushed by means of the cob-crushing sleeve, and after it has been crushed it is carried into the first chamber of the first mill, where it is ground between the disks of the said first mill and discharged into the conveyer-case. Thence it is carried to the other or second mill and fed between pairs of grinding-disks, where it is reground finer by reason of the pressure of the coarse product in the first mill and discharged from the mill.

In practice the grinding-disk of the first mill, attached to the tramming-ring, moves into true tram with the running disk, as also the disk on the back of the tramming-ring of the second mill, which rocks on the bridge-tree, which in turn is supported on the points of the temper-screws, like a mariner's compass, whereby the bridge-tree and back disk may be crowded forward, whereupon the second mill is caused to grind finer, and this in turn moves the spindle or shaft forward, causing the first mill to grind finer until the pressure of the two mills is equalized.

It has been practically demonstrated that by means of this construction, combination, and arrangement of parts hereinbefore described the results above stated are realized and made practical; but I reserve the right to make all such changes therein and modifications thereof as fairly come within the scope of my invention.

Having fully described my invention, what I claim, and desire to secure by Letters Patent, is—

1. A grinding-mill provided with a longitudinally-movable spindle, oppositely-facing non-rotating disks, and rotating disks carried by said spindle, whereby the pressure of the coarse material in the first mill will cause the second mill to grind finer.

2. A grinding-mill provided with a longitudinally-movable spindle, oppositely-facing non-rotating disks, rotating disks and means for conveying the coarsely-ground material from the first to the second mill, where it is reground finer by reason of the pressure of the coarse material in the first mill.

3. A grinding-mill provided with a longitudinally-movable spindle, non-rotating disks, rotating disks rigidly mounted upon said spindle, a screw conveyer arranged parallel with said spindle and in juxtaposition to said mills, adapted to directly receive the coarsely-ground material forced upwardly thereinto from the first mill and discharge all of said coarsely-ground material into the second mill where it is reground finer, whereby the automatic adjustment of the runners is effected by the relative quantities of the feed passing through the two mills.

4. A grinding-mill provided with a longitudinally-movable spindle, non-rotating disks, rotating disks rigidly mounted upon said spindle and a screw conveyer journaled in an extension of the mill-casing having a segmental spout to receive the coarsely-ground material from the first mill, said conveyer discharging said material adjacent to the second mill, where it is reground finer by the counterbalancing construction of the mills.

5. A grinding-mill provided with a two-part frame having suitable supports, a spindle mounted in said frame, a toothed sleeve on the spindle in the crushing-chamber, grinding-disks mounted on said spindle, a dam between the grinding-mills, a running head carried by the spindle and revolving within said dam forming a partition between the mills, non-rotating grinding-disks with which said rotating disks operate, a drive-wheel and flywheel mounted on one end of said spindle, means for transferring material from the crushing-chamber to the grinding-disks next adjacent thereto, a screw conveyer for conveying the material from the first to the second mill, and means for revolving said drive-wheel.

6. A vertical-disk grinding-mill provided with an outer casing, a spindle journaled therein, a rotating disk a non-rotating disk, a case detachably mounted within said casing and having a central tubular portion surrounding said spindle and forming the eye of the mill, and a peripheral flange or rim, said case being adapted to receive one of said non-rotating disks and prevent leakage of meal into the eye and means for operating the spindle.

7. A vertical-disk grinding-mill provided with an outer casing, a spindle journaled therein a rotating disk, a non-rotating disk, a case mounted within said casing having a central tubular portion surrounding said spindle and forming the eye of the mill, and a peripheral flange or rim, a back tramming-ring movably supported in said case, a bridge-tree adjustably supported between said case and ring on regulating-screws passing through said case and a grinding-disk carried by said ring, whereby the position of said disk can be adjusted and will automatically tram.

8. A grinding-mill provided with a casing, a longitudinally-movable spindle journaled therein, non-rotating disks mounted upon automatically-adjustable supports within said casing, rotating disks mounted upon said spindle, whereby the grinding pressure in the first mill will automatically cause the second mill to grind the ground material finer, means for conveying the ground material from the first to the second mill and means for operating the spindle.

9. A vertical-disk grinding-mill provided with independent grinding-mills, a two-part dam or partition formed integral with the mill-casing and separating said mills, a longitudinally-movable spindle carrying the rotating disks of said mills, the first mill being adapted to grind the material coarse and the second mill to regrind the same material finer by reason of the grinding pressure in the first mill, and a screw conveyer arranged parallel with said spindle to convey the ground material from the first to the second mill.

10. A grinding-mill provided with a longitudinally-movable spindle, rotating disks carried by said spindle, movably-mounted non-rotating disks, whereby the pressure in the first mill will automatically force the disks of the second mill nearer together and cause the latter to grind the coarsely-ground material finer, and a screw conveyer having a segmental receiving-spout extending over the first mill adapted to receive the ground material forced thereinto from said mill and discharge it to the second mill.

11. A grinding-mill provided with a casing, a case mounted therein having a central tubular portion forming the eye of the mill, and a concentric rim or flange, said case carrying means to engage said casing and prevent the rotation of the case and a bridge-tree supported within said case.

12. A grinding-mill provided with a longitudinally-movable spindle, a running head rigidly mounted thereon, and having two disks carrying oppositely-facing revolving grinding-disks and non-rotating disks with which the rotary disks operate.

13. A grinding-mill consisting of a casing, a longitudinally-movable spindle journaled therein, a cob-crushing sleeve carried by said spindle, a running head rigidly mounted upon said spindle, oppositely-facing, revolving disks carried by said running head, a back feed-screw also carried by said spindle, and non-rotating disks within said casing.

14. A grinding-mill provided with a casing having a feeding-chamber at the opposite ends thereof, two grinding-cases mounted therein, a longitudinally-movable spindle journaled in said casing, a right and left hand feeding-screw upon said spindle within said chambers, the feed-screw in the first chamber forcing the material into the first mill and that in the second chamber forcing the coarsely-ground material into the second mill where it is reground finer, means for conveying the ground material from the first to the second mill and means for operating the parts.

In testimony whereof I affix my signature in presence of two witnesses.

AMBROSE W. STRAUB.

Witnesses:
 THEO. H. MCCALLA,
 EDWARD J. LYNCH.